United States Patent [19]

Frencken

[11] Patent Number: 6,008,849
[45] Date of Patent: *Dec. 28, 1999

[54] METHOD AND SYSTEM FOR DECODING CODED VIDEO SIGNALS

[75] Inventor: Peter H. Frencken, Weert, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/561,572

[22] Filed: Nov. 21, 1995

[30] Foreign Application Priority Data

Nov. 25, 1994 [EP] European Pat. Off. .............. 94402708

[51] Int. Cl.⁶ .............................. H04N 7/12; H04N 11/02; H04N 11/04
[52] U.S. Cl. ............................................ 348/415; 348/402
[58] Field of Search ..................................... 348/423, 402, 348/413–15, 416, 726; 386/125, 126, 95, 111, 45, 33; H04N 7/12, 11/02, 11/04

[56] References Cited

U.S. PATENT DOCUMENTS

| | | | |
|---|---|---|---|
| 5,294,974 | 3/1994 | Naimpally et al. | 348/395 |
| 5,381,145 | 1/1995 | Allen et al. | 348/397 |
| 5,504,530 | 4/1996 | Obikane et al. | 348/413 |
| 5,504,823 | 4/1996 | Yoon | 348/399 |
| 5,510,840 | 4/1996 | Yonemitsu et al. | 348/402 |
| 5,574,504 | 11/1996 | Yagasaki et al. | 348/413 |
| 5,576,765 | 11/1996 | Cheney et al. | 348/416 |

OTHER PUBLICATIONS

ISCAS 94, London, May 1994, Chapter 3.22, "VLSI Inplementation of MPEG Decoders".

*Primary Examiner*—Howard Britton
*Assistant Examiner*—Nhon T. Diep
*Attorney, Agent, or Firm*—Laurie E. Gathman

[57] ABSTRACT

Presently most MPEG video decoders use 16 Mbit of external memory. This memory capacity is almost completely occupied by the video decoding process in case of 625 line/50 Hz systems. Also the communication speed to the external memory is rather high. In future decoders, additional functions will be added to the video decoder, a need for free memory space and communication bandwidth will come up soon. Memory bandwidth becomes available with the application of synchronous dynamic random access memories (SDRAM) although high memory bandwidths lead to high operating frequencies. In order to release some memory capacity, a modification in the video decoding process is proposed by which 1 up to 3 Mbit of memory capacity can be saved. This modification has no big impact on the memory communication bandwidth. In order to keep the speed requirements in the variable length decoding within practical limits, a 2 step video decoding approach is proposed. On basis of this approach, several alternatives are possible, each with a different trade-off between extra processing requirements and memory saving.

5 Claims, 7 Drawing Sheets

| | | | | | | | | | | | | |
|---|---|---|---|---|---|---|---|---|---|---|---|---|
| (a) | I1 | B-1 | B0 | P4 | B2 | B3 | P7 | B5 | B6 | P10 | B8 | B9 |
| (b) | P-2 | B-1 | B0 | I1 | B2 | B3 | P4 | B5 | B6 | P7 | B8 | B9 |
| (c) | 15 | 15 | 15 | 15 | 15 | 15 | 15 | 15 | 15 | 15 | 15 | 15 |
| (d) | 48 | 12 | 12 | 24 | 12 | 12 | 24 | 12 | 12 | 24 | 12 | 12 |
| (e) | 42 I1 | 42 B-1 | 42 B0 | 42 P4 | 42 B2 | 42 B3 | 42 P7 | 42 B5 | 42 B6 | 42 P10 | 42 B8 | 42 B9 |
| (f) | 0 | 53 | 53 | 53 I1 | 53 I1 | 53 I1 | 53 P4 | 53 P4 | 53 P4 | 53 P7 | 53 P7 | 53 P7 |
| (g) | 0 | 53 I1 | 53 I1 | 0 | 53 P4 | 53 P4 | 0 | 53 P7 | 53 P7 | 0 | 53 P10 | 53 P10 |
| (h) | 42 | 42 | 42 | 42 | 42 I1 | 42 B2 | 42 B3 | 42 P4 | 42 B5 | 42 B6 | 42 P7 | 42 B8 |
| (i) | 84 I1 | 84 B-1 | 84 B0 | 84 P4 | 84 B2 | 84 B3 | 84 P7 | 84 B5 | 84 B6 | 84 P10 | 84 B8 | 84 B9 |
| (j) | 0 | 105 | 105 | 105 I1 | 105 I1 | 105 I1 | 105 P4 | 105 P4 | 105 P4 | 105 P7 | 105 P7 | 105 P7 |
| (k) | 0 | 105 I1 | 105 I1 | 0 | 105 P4 | 105 P4 | 0 | 105 P7 | 105 P7 | 0 | 105 P10 | 105 P10 |
| (l) | 84 | 84 | 84 | 84 | 84 I1 | 84 B2 | 84 B3 | 84 P4 | 84 P5 | 84 B6 | 84 P7 | 84 B8 |
| (m) | 100 | 100 | 100 | 100 | 100 | 100 | 100 | 100 | 100 | 100 | 100 | 100 |
| (n) | 415 | 695 | 695 | 549 | 695 | 695 | 549 | 695 | 695 | 549 | 695 | 695 |

(o) 635 Mbits/sec

METHOD AND SYSTEM FOR DECODING CODED VIDEO SIGNALS

BACKGROUND OF THE INVENTION

The invention relates to a method of decoding coded video signals which result from series coding macroblocks of pictures consisting of two interlaced fields, each macroblock comprising luminance blocks and chrominance blocks, and have been transmitted and/or stored in the form of digital signals which regroup the signals defining parameters of each macroblock and the useful signals associated with each pixel of each macroblock and correspond to sequential pictures of type I, P or B, respectively, dependent on whether said pictures are coded without reference to another picture of the sequence or are composed of macroblocks, the majority of which is predicted by means of unidirectional motion compensation based on an I or P picture, or of macroblocks, the majority of which is interpolated by means of bidirectional motion compensation based on I and/or P previous and subsequent pictures, said method comprising, in series, a step of decoding said coded video signals, a step of storing signals thus decoded and a step of displaying said signals at the field frequency.

The invention also relates to a decoding system for performing the method according to the invention and to a video reception equipment including such a decoding system. This invention is used in the field of digital television, both in current definition and in high definition, and notably where the television signals are compatible with the MPEG standard whose characteristic features will be described hereinafter.

In the last few years the International Standardization Organisation ISO has developed different algorithms for compressing digital data, and notably the MPEG standard (named after the group of experts who worked out this standard: Moving Picture Experts Group). This algorithm is based on two basic techniques: a transform of the signals to be compressed, with which the spatial redundancy within one picture can be reduced, and a compensation of motion between pictures, with which the temporal redundancy between these pictures can be reduced.

Motion compensation is a technique combining pictures which have already been coded with data which are representative of motions within successive pictures. As the pictures are subdivided into blocks, the coder searches data in a preceding picture, which data represent the best possible approximation of those data during coding, and then expresses the spatial shift between these data with the aid of a vector which is representative of this shift, i.e. of the motion between this preceding picture and the current picture. The block of data thus selected is used as a prediction of the block of current data. The coding is based on the residual prediction error computed by means of the difference between this previous selected block and the current block. Upon decoding, the inverse process is used to restore the initial pictures. In the MPEG standard, the motion compensation is effected per macroblock consisting of 16×16 pixels, more precisely of four luminance blocks of 8×8 pixels completed by two chrominance blocks of also 8×8 pixels.

Three types of pictures are defined: the pictures of the type I, referred to as "intra", which are coded without reference to any other previous picture (and thus provide random access to the sequence of coded pictures), the pictures of the type P, predicted by motion compensation based on a previous picture of the type I or of the type P, and the pictures of the type B, which are predicted (or interpolated) by means of bidirectional motion compensation (i.e. based on a previous picture and a subsequent picture, either one being of the type I or P). To permit this interpolation or bidirectional prediction, the pictures are transmitted in an order which is different from that in which they are subsequently displayed, so that said previous and subsequent pictures should both be available in order that the interpolation can be performed.

U.S. Pat. No. 5,294,974 shows (in FIG. 1) the diagrammatic structure of a coder which is suitable for supplying a stream of digital data whose syntax is in conformity with the MPEG standard. In this coder, the luminance and chrominance signals obtained after shifting the original pictures are converted into blocks (after this format conversion, each picture of the sequence is henceforth represented by a sequence of blocks of 8×8 pixels, each pixel itself being represented by a digital word of 8 bits, while the blocks are regrouped in macroblocks as described hereinbefore). A motion estimation between each current macroblock and a predicted macroblock by searching the similar macroblock within a preceding reference picture subsequently provides the possibility of defining the coding mode per macroblock. Each macroblock of I pictures is coded in accordance with the "intra" mode. For the pictures of type P, the coding mode is either the unidirectional prediction mode, or the "intra" mode for certain macroblocks. For the pictures of the type B, the coding mode is the bidirectional prediction mode, but also the unidirectional prediction mode (beforehand or afterwards) or even the "intra" mode for certain macroblocks. For modes other than the "intra" mode, the predicted macroblock is subtracted from the current macroblock and only the residual macroblock is coded.

The "intra" macroblocks or the residual macroblocks (dependent on the mode) are then after transform of the spatial domain into the frequency domain (by way of, for example a discrete cosine transform of blocks, denoted DCT) and quantization, coded in a variable-length coding circuit. The signals thus coded are stored for constituting the stream of coded data and dequantized and then transformed by way of the inverse orthogonal transform of the preceding one for constricting the predicted macroblock with which the current macroblock is compared in the modes other than the "intra" mode.

The syntax of the stream of coded data as well as the method of decoding this stream of data in conformity with said standard (but not the coding method which is only compatible with this syntax and this decoding method) are described in various documents edited by the International Standardization Organisation, and notably in its periodically edited recommendations. Moreover a decoder which is suitable for decoding a stream of MPEG data is shown in the document ISCAS 94, London, May 1994, chapter 3.22, "VLSI implementation of MPEG decoders".

Figure 1:
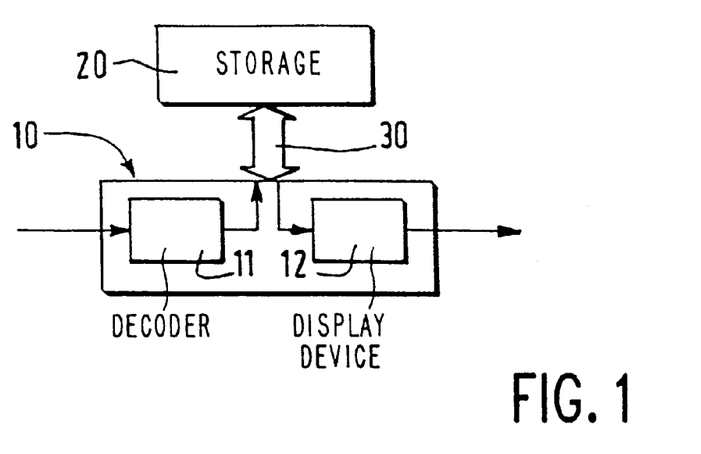
FIG. 1 shows the general structure of an MPEG decoder of the conventional type.

The general structure of the decode described in the latter document is described with reference to FIG. 1. The coded signals, which have been transmitted and/or stored, are received by a decoding sub-assembly 10 whose output signals are the pixels to be displayed. This decoding sub-assembly 10 is connected to a storage sub-assembly 20 via a bus 30. The decoding sub-assembly 10 comprises a decoding device 11 and a display device 12. The decoded signals supplied by the decoding device 11 are stored in the storage sub-assembly in the form of macroblocks of 16×16 pixels having the CCIR format 601 4:2:0. The macroblocks thus stored are subsequently applied to the display device 12 which ensures their conversion so as to adapt them to the output format required, viz. the interlaced mode 4:2:2 (an interlaced picture is composed of two odd and even fields temporally shifted by half a picture and spatially by one line, the odd field regrouping the odd lines and being displayed first, and the even field regrouping the even lines).

Figure 2:
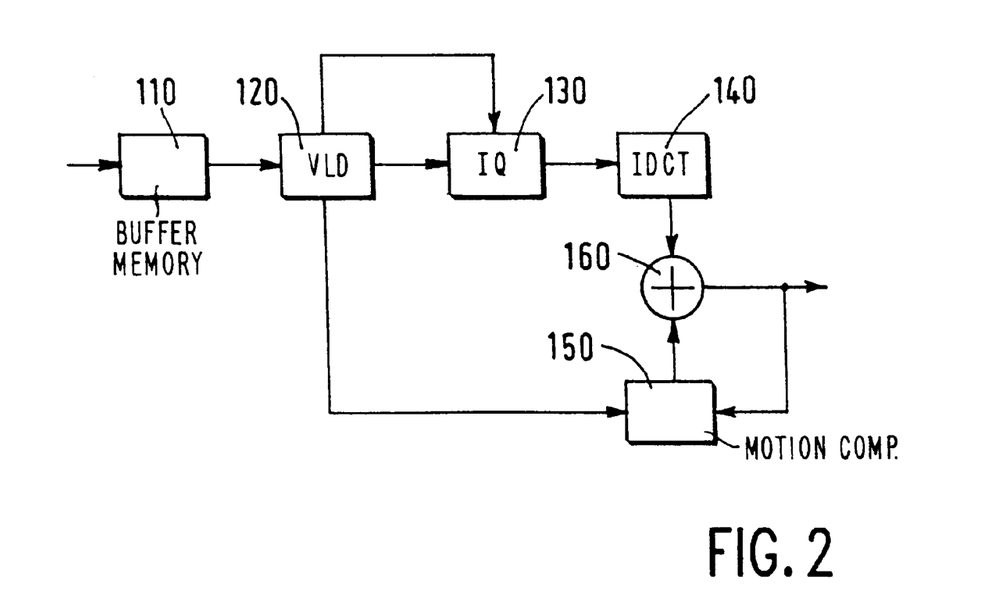
FIG. 2 illustrates the operation of an MPEG decoder of the conventional type.

FIG. 2 illustrates the operation of the decoding device, characteristic of the MPEG standard. The coded signals constituting the stream of MPEG data are first stored in a buffer memory 110. All the sequence and group headers of the pictures are read in this memory. Subsequently, the start of each coded picture and the type of this picture are identified and the successive decoding of each macroblock is effected in a variable-length decoding circuit 120. Each block (or macro block) of decoded data is then submitted to inverse quantization (per macroblock) and inverse transform from the frequency domain to the spatial domain (here, in inverse quantization and inverse discrete cosine transform circuits 130 and 140). A motion compensation circuit 150 receives the motion vectors and the signals indicating the type of each macroblock (intra or residual, dependent on the coding mode), and then supplies the predicted macroblocks which are added to the decoded signals in an adder 160 (for the modes other than the "intra" mode) whose output supplies the reconstituted signals to be displayed for reconstructing the pictures. If these pictures are of the type I or P, they are also stored in so far as they are reference pictures which are indispensable for reconstituting the pictures of type B. Before display, the natural order of these pictures I, P, B is restored.

In the 625 lines/50 Hz transmission systems, the majority of MPEG decoders use an external memory of approximately 16 Mbits (1 megabit=$2^{20}$ bits) whose capacity for picture sizes of 720×576 pixels is divided as follows:

(a) input buffer memory 110: approximately 2.5 Mbits (in accordance with the MPEG specifications a capacity of 1.85 Mbit would be sufficient for this memory, but in practice a capacity supplement of approximately 600 kbits proves to be necessary);

(b) memories for storing Previous and subsequent reference pictures (as explained, these two pictures are necessary for the bidirectional interpolation of the macroblocks of the type-B pictures, and the required memory capacity is 720× 576×8×1.5=5 Mbits per picture, i.e. 10 Mbits);

(c) memory for each type-B picture: approximately 3.8 Mbits.

The minimum capacity thus reached is 16.3 Mbits, which for an external memory size of 16.8 Mbits ($2^{24}$=16.8.10$^6$) leaves only 500 kbits available for other uses.

This restriction is accompanied by that relating to the bandwidth for the memory access, which is concisely referred to as rate or memory bandwidth in the following description and which is representative of the rate of communication between the decoding sub-assembly 10 and the storage sub-assembly 20. The value of the useful memory bandwidth is not constant from one macroblock to the other: the macroblocks coded in accordance with the "intra" mode employ lower values, whereas those predicted by means of bidirectional interpolation with motion vectors determined to half a pixel require higher values. This rate of communication between the sub-assemblies 10 and 20 may vary in a range between approximately 400 to 700 Mbits/second. As has also been explained, the external memory used for the storage sub-assembly 20 is a memory of 16 Mbits (here a synchronous dynamic random access memory SDRAM), operating at 54 MHz, at which the memory bandwidth is 864 Mbits/second which is just above the range stated hereinbefore.

Thus it appears that the memory capacity and the memory bandwidth are substantially completely used when the method of decoding the video signals here processed is being performed. It is therefore practically impossible to carry out supplementary operations while this method is being performed. Whereas in the near future the increasing integration of functions would permit such operations as, for example teletext, graphic processing, screen display, etc., these limitations inhibit their use in practice.

SUMMARY OF THE INVENTION

It is a first object of the invention to provide a method of decoding coded signals which are compatible with the MPEG standard and evade these limitations, thus providing the possibility of carrying out supplementary operations such as those mentioned.

To this end, the invention relates to a coding method as described in the opening paragraph, which is characterized in that for the signals relating to the luminance of each macroblock of type B, said decoding and display steps are subdivided into two sub-steps of decoding signals corresponding to each field and into two sub-steps of displaying said fields, and in that each sub-step of decoding a field immediately precedes each sub-step of displaying said field and, with a view to on-the-fly-decoding of said type-B macroblocks, is effected at the same rate without any buffer storage during said storage step.

With the method thus proposed, the luminance information components of the type-B macroblocks are only decoded at the instant when they must be available for display, which renders it unnecessary to store them and thus realises an economy of space in the memory.

In a modification of the on-the-fly decoding method thus proposed, this method is characterized in that for the signals relating to the luminance of each macroblock of type B, the decoding step is subdivided into two decoding sub-steps, a first sub-step for decoding, at the frame frequency, said definition signals associated with said macroblocks, and a second sub-step for decoding said useful signals of said macroblocks at the field frequency, said second decoding sub-step immediately preceding the step of displaying macroblocks of type B and, with a view to on-the-fly-decoding of said type-B macroblocks, being effected at the same rate without any buffer storage of said useful signals during said storage step.

While in the first proposed implementation, the decoding operation may be realised at a raised frequency because it would be realised twice in succession for each macroblock, the modified solution, which consists of dividing this decoding operation into two successive operations, the first of which concerns the signals for defining the macroblocks and is carried out at a nominal rate, and the second of which concerns only the useful signals and is carried out at a higher rate which is equal to the display rate in order that the decoded signals can immediately be displayed without any buffer storage, provides considerable improvements. Since the first decoding sub-step only concerns the signals for defining the macroblocks, it is much simpler than the decoding method carried out in an MPEG decoder of the conventional structure. Moreover, the fact that, at the expense of using a small auxiliary memory zone, said definition signals have been previously decoded and stored and, particularly since the lengths of the headers and the macroblocks are known before the second decoding sub-step is carried out, the useful signals can be decoded at a considerably accelerated rate by way of a parallel execution.

The solution which is particularly proposed consists of subdividing the second decoding sub-step into two parallel operations of variable-length decoding each line of macroblocks to ensure parallel decoding of one half of each macroblock line.

Another modification of this method is characterized in that the second decoding sub-step is subdivided into two parallel operations of variable-length decoding each macroblock line to ensure parallel decoding of one half of each macroblock line. This parallelization of the second sub-step provides the possibility of accelerating the decoding process.

The decoding method may also be improved in that decoding-on-the-fly according to the invention relates to both chrominance and luminance information components. The memory bandwidth economy is thus further increased.

In all the cases, the decoding and display steps or sub-steps of the proposed method are particularly adapted to process MPEG coded video signals.

Complementary improvements each realising a new economy of the memory passband are the conversion of the format of the macroblocks into the video display format during the decoding method itself and without the use of the external memory, or also in that the blocks of coefficients obtained from the transform of the signals to be decoded from the spatial domain to the frequency domain are not decoded in the order of transmission, after this conversion, but in the order in which the lines to be subsequently displayed are transmitted per field.

It is another object of the invention to propose a decoding system which is suitable for performing the decoding method according to the invention in any one of the modifications described hereinbefore.

To this end, the invention particularly relates to a system for decoding coded video signals which result from series coding macroblocks of pictures consisting of two interlaced fields, each macroblock comprising luminance blocks and chrominance blocks, and have been transmitted and/or stored in the form of digital signals which regroup the signals defining parameters of each macroblock and the useful signals associated with each pixel of each macroblock and correspond to sequential pictures of type I, P or B, respectively, dependent on whether said pictures are coded without reference to another picture of the sequence or are composed of macroblocks, the majority of which is predicted by means of unidirectional motion compensation based on an I or P picture, or of macroblocks, the majority of which is interpolated by means of bidirectional motion compensation based on I and/or P previous and subsequent pictures, said system comprising a decoding sub-assembly connected to a sub-assembly for storing signals thus decoded via a bus and consisting of a decoding device and a device for displaying said signals at the field frequency, characterized in that for decoding and displaying the signals relating to the luminance and possibly to the chrominance of each macroblock of type B, said system comprises means for subdividing said two operations into two sub-steps of decoding signals corresponding to each field and into two sub-steps of displaying said fields, each sub-step of decoding a field being performed immediately before the corresponding sub-step of displaying said field and, with a view to on-the-fly-decoding of said type-B macroblocks, at the same rate without any buffer storage.

In accordance with another important embodiment, the invention also relates to a system for decoding coded video signals which result from series coding macroblocks of pictures consisting of two interlaced fields, each macroblock comprising luminance blocks and chrominance blocks, and have been transmitted and/or stored in the form of digital signals which regroup the signals defining parameters of each macroblock and the useful signals associated with each pixel of each macroblock and correspond to sequential pictures of type I, P or B, respectively, dependent on whether said pictures are coded without reference to another picture of the sequence or are composed of macroblocks, the majority of which is predicted by means of unidirectional motion compensation based on an I or P picture, or of macroblocks, the majority of which is interpolated by means of bidirectional motion compensation based or I and/or P previous and subsequent pictures, said system comprising a decoding sub-assembly connected to a sub-assembly for storing signals thus decoded via a bus and consisting of a device for decoding and a device for displaying said signals at the field frequency, characterized in that for decoding and displaying the signals relating to the luminance and possibly to the chrominance of each macroblock of type B, said system comprises means for subdividing the decoding operation into two decoding sub-steps, a first sub-step for decoding, at the frame frequency, said definition signals associated with said macroblocks, and a second sub-step for decoding said useful signals of said macroblocks at the field frequency, said second decoding sub-step immediately preceding the step of displaying macroblocks of type B and, with a view to on-the-fly-decoding of said type-B macroblocks, being effected at the same rate without any buffer storage of said useful signals.

In the latter embodiment, it is possible to use a modification in accordance with which said sub-dividing means are provided for subdividing the second decoding sub-step into two variable-length decoding operations ensuring parallel decoding of one half of each macroblock line.

It is finally a third object of the invention to propose a video reception equipment including a decoding system which is provided for processing MPEG-coded video signals.

These and other aspects of the invention will be apparent from and elucidated with reference to the embodiments described hereinafter.

BRIEF DESCRIPTION OF THE DRAWING

In the drawings:

FIGS. 3 to 9 show, per picture and for a known decoder similar to that shown in FIG. 3:

the input pictures of the decoder (FIG. 3);

the evolution of the contents of the input memory of this decoder (FIG. 4);

the decoded pictures (FIG. 5);

the pictures of the type I or P stored in two reference memories with a view to rendering the interpolation of the pictures of type B possible (FIGS. 6 and 7);

the pictures in the display memory (FIG. 8);

the restored and displayed pictures (FIG. 9);

DETAILED DESCRIPTION OF THE PREFERRED EMBODIMENTS

Before the method according to the invention is described, several aspects of operation of the decoder shown in FIG. 2 will be described with reference to FIGS. 3 to 10.

Figure 3:
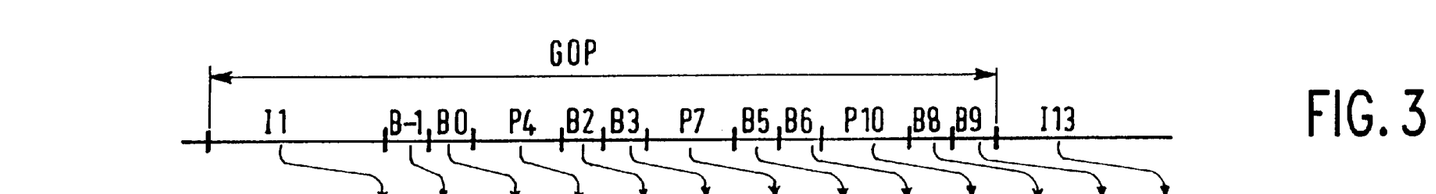

FIG. 3 shows, per picture of the type I, P or B and for a group of 12 pictures (denoted GOP, Group Of Pictures, in the Figure) the stream of coded data which is present at the input of said decoder. While the natural order of the pictures (the order which would initially exist before any coding, as the one which must be restored, after decoding, for display) is given, for example by the following sequence: $B_{-1}$ $B_0$ $I_1$ $B_2$ $B_3$ $P_4$ $B_5$ $B_6$ $P_7$ $B_8$ $B_9$ $P_{10}$ $B_{11}$ $B_{12}$ . . . , the order of transmission is modified in order that the pictures I and P for interpolating the pictures B are already present and decoded for restoring these pictures B. The modified order is as follows: $I_1$ $B_{-1}$ $B_0$ $P_4$ $B_2$ $B_3$ $P_7$ $B_5$ $B_6$ $P_{10}$ $B_8$ $B_9$ $I_{13}$ . . . (the pictures $I_1$ and $P_4$ are present before the pictures $B_2$ and $B_3$ of which they permit the determination and similarly for the picture $P_4$ and $P_7$ before the pictures $B_5$ $B_6$, etc. . . . ).

Figure 4:
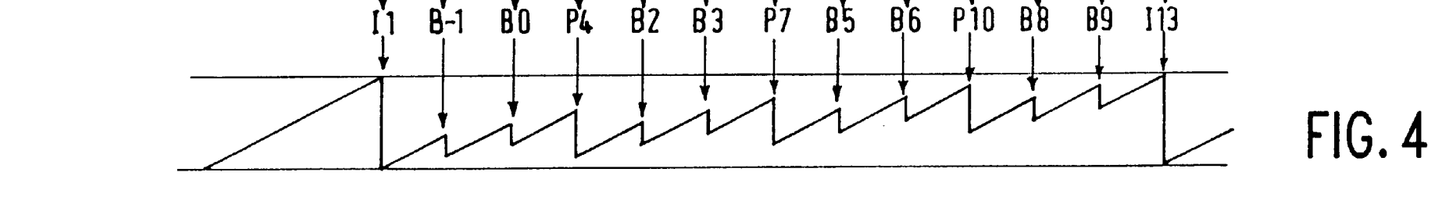
Figure 5:
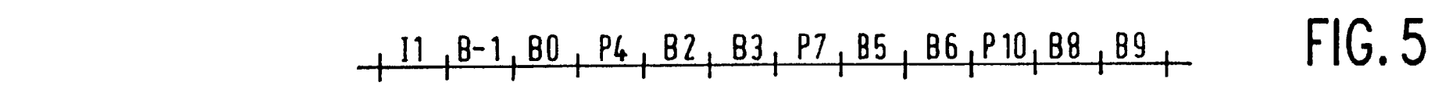

These coded input data are applied to the memory 110 which is a part of the storage sub-assembly 20 and in this case is of the FIFO type (First In, First Out: the data written first are also read first). FIG. 4 is a temporal diagram showing, for each picture, the process of storage in this FIFO memory (die picture whose storage takes place is signalized at the end of the slope illustrating the progression of this storage operation). Each picture may then be decoded. To satisfy the MPE; standard requirements for bitrate control, all the data relating to a picture should theoretical be present in the memory at the instant when the decoder treats this image. This is illustrated in FIG. 5 which shows the temporal position of decoding, picture by picture, with respect to storage of the same pictures in the FIFO memory (decoding does not start until storage is terminated).

Figure 6:
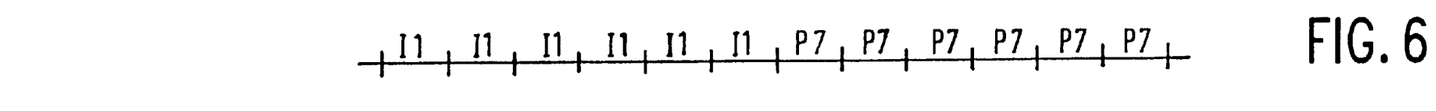
Figure 7:
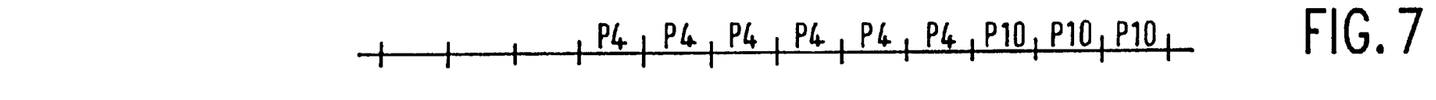
Figure 8:
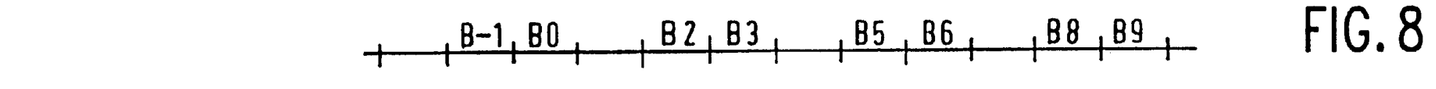
Figure 9:
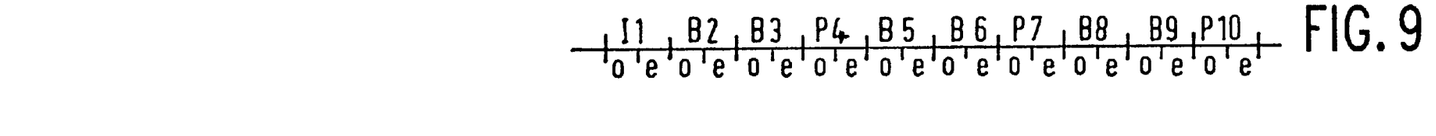

Chronologically, the detailed process of storing and displaying the picture during decoding for the group of pictures chosen as an example, is as follows. The intra picture $I_1$ (i.e., successively all its macroblocks) is decoded and then oriented for storage in the first reference memory (in which it is preserved until another decoded picture succeeds it, i.e. in this case during a period which is equal to six picture periods), as indicated in FIG. 6 which shows the contents of this memory (FIG. 7 shows the contents of the other reference memory). With the picture $I_1$ thus being decoded and stored, two picture periods pass during which the two pictures of type B are interpolated in the order of transmission and/or storage in accordance with the picture $I_1$, but which would be preceded by the picture $I_1$ in the natural order of the original pictures and can thus be denoted as $B_{-1}$ and $B_0$. These pictures $B_{-1}$ and $B_0$ are immediately stored in the display memory for successive field-by-field display (the odd and even frames are denoted "o" and "e", respectively). FIGS. 8 and 9 show the contents of the display memory and the display chronology, respectively.

It will be noted that the display is shifted by one field with respect to storage in the display memory. After one field period (half a period of the picture) the information of the odd lines, i.e. of the odd field is entirely available in the display memory and this odd field may be displayed. This information of the odd lines is no longer useful and the space thus emptied in the memory permits storage of the information of the even lines. With an appropriate synchronization of decoding and display it is thus a single field at a time which must be stored in the display memory for the pictures B. For various reasons (higher capacity necessary for the last line of macroblocks; greater complexity of the address generator with respect to the case where two fields would be stored; storage of the whole chrominance picture, i.e. 228 lines rather than one field only), the necessary space in the memory for storing the pictures B is actually a bit larger, of the order of 4 Mbits.

When the decoding (by means of bidirectional interpolation) of the pictures $B_{-1}$ and $B_0$ is terminated, the decoding of picture $P_4$ will succeed it in the order of transmission and/or storage. This picture $P_4$ is decoded and then oriented towards the second reference memory (in which it will also be preserved until another decoded picture succeeds it six picture periods later) as indicated with reference to FIG. 7. As previously for the pictures $B_{-1}$ and $B_0$, the pictures $P_4$ and $I_1$ will then permit interpolation of the pictures $B_2$ and $B_3$ which follow $P_4$ in the order of transmission and/or storage. These pictures $B_2$ and $B_3$ are stored in the display memory for successive display (field by field). Between the display of the pictures $B_{-1}$, $B_0$ and that of the pictures $B_2$ and $B_3$, the picture $I_1$ has been displayed by reading the first reference memory so as to restore the natural order of the pictures corresponding to the order of the original pictures and, after this display of $B_2$ and $B_3$, the picture $P_4$ is displayed. The decoding process is then continued in the same manner as hereinbefore, in the order of transmission and/or storage ($P_7$; $B_5$ and $B_6$ from $P_4$ and $P_7$; $P_{10}$; $B_8$ and $B_9$ from $P_7$ and $P_{10}$; etc. . . . ) and the display is continued likewise, in the natural order of the original pictures ($B_5$, $B_6$, $P_7$, $B_8$, $B_9$, $P_{10}$, etc. . . . ).

Figure 10:
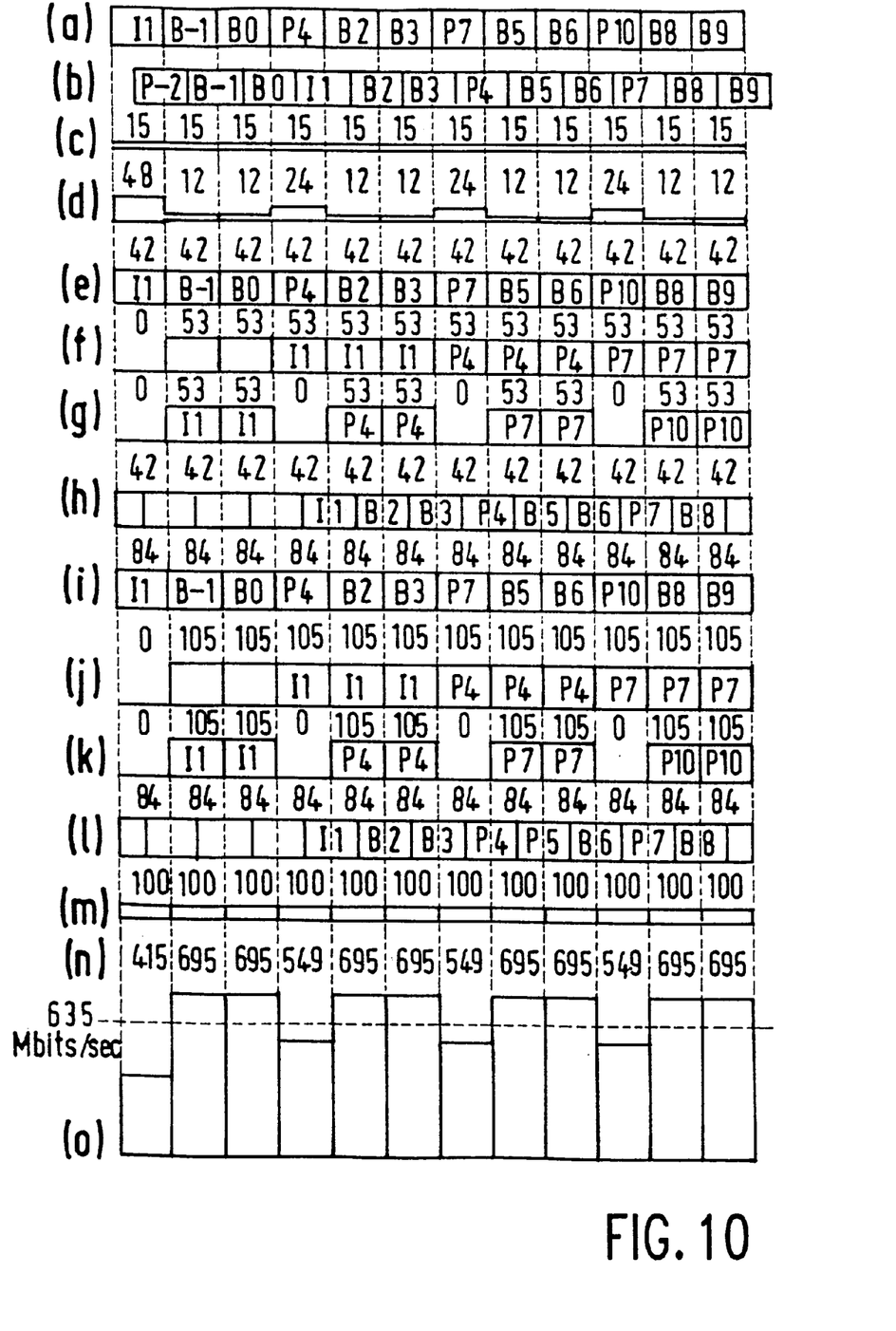
FIG. 10 indicates for this known decoder the limitations of the memory bandwidth in the most unfavourable situation.

With this control of the memory being described, FIG. 10 shows in a corresponding manner the time limitation; of communication (i.e. of the memory bandwidth) during the various decoding steps, and in the most unfavourable situation (as has been shown, the useful bandwidth is varying in accordance with the macroblocks, those of the type I by using fewer than those which are predicted), i.e. in the case where all the macroblocks are predicted (in principle, any decoder architecture should meet the most unfavourable situations in the matter of processing power). In this FIG. 10, the indications on each line "a" to "o" are either a sequence of pictures (lines a, b, e, g, h, i, j, k, l) or references of the bandwidth in Mbit/second (lines c to n). Line by line, these indications are:

(a) pictures to be decoded (they are presented in the order of transmission and/or storage);

(b) pictures displayed in their natural order (and, as stated above, with a temporal shift of one field with respect to the decoded pictures);

(c) rate of access to the input memory 110, with pictures I, P or B comprising 2, 1 or 0.5 Mbit of information, respectively, divided equally throughout the picture;

(d) rate of information components between this memory 110 and the decoding circuit 120 (the largest number of bits is associated with the transmitted pictures I and the smallest number of bits is associated with the pictures B);

(e) transfer of decoded chrominance information components from the decoding circuit 120 to the memory of the display device 12, referred to as display memory (i.e. 8×8×1620×2×25×8 bits/sec);

(f) and (g) motion compensation beforehand and afterwards, respectively, for the chrominance components (9×9×1620×2×25×8 bits/sec);

(h) from the display memory, display of these information components corresponding to the chrominance components;

(i) to (l) as for the chrominance (steps e to h) these steps i to l correspond respectively to the transfer of decoded luminance information components from the circuit 120 to the display memory (16×16×1620×2×25×8 bits/sec), to the motion compensations beforehand and afterwards (18×18×1620×2×25×8 bits/sec), and to the display of these luminance information components (16×16×1620×2×25×8 bits/sec);

(m) transfer of various other information components such as headers, etc. (also divided throughout the pictures);

(n) passband roughly necessary for each picture, taking various preceding operations into account, (o) representation of the corresponding memory access time for each picture with the average of this access time being shown in a broken line.

After the description of an MPEG decoder of the conventional type, the description of the invention will now follow. The principle of the invention is no longer to store the decoded information components relating to pictures B in the display memory, but to decode the coded information components corresponding to these pictures exactly at the instant when the resultant decoded information components must be available for display, in accordance with a principle referred to as decoding-on-the-fly. This decoding method according to the invention will hereinafter be described with reference to several variants.

In a first embodiment, the decoding method is a direct method. As has been stated, the signals to be decoded correspond to pictures of the type I, P or B and they are arranged in macroblocks comprising four luminance blocks and two chrominance blocks and, prior to decoding to which they are submitted, they are transmitted and/or stored in the form of digital signals regrouping the signals defining the parameters of each macroblock and the useful signals. Said definition signals comprise for each macroblock the header of the macroblock, its address, the associated motion vector (s), the quantization step, the prediction value of the DC coefficient of each block of the macroblock, etc., as well as information about the length of each block. The useful signals are all the other signals, i.e. the signals which correspond to the pixels and which have been obtained by a transform from the spatial domain to the frequency domain (in general, a discrete cosine transform), followed by a quantization and a variable-length coding.

The method of direct decoding, which comprises, in series and in a traditional way, a step of decoding coded video signals, a step of storing the signals thus decoded and a step of displaying these signals at the field frequency is modified, according to the invention, in the following way as far as the signals relating to the luminance and chrominance of each macroblock of the type B are concerned. The step of decoding and the step of display are subdivided into two sub-steps of decoding signals corresponding to each field and into two sub-steps of displaying these fields, and each of these sub-steps of decoding a field immediately precedes each sub-step of displaying this field and is effected at the same rate, without any buffer storage during the storage step which precedes the display step. With this absence of storage in the display memory, the operation can be termed as "decoding-on-the-fly".

In this example it should be noted that the coded signals contain the information components relating to two finds for each macroblock. In order that decoding-on-the-fly is possible, each macroblock should thus be decoded twice, a first time just before displaying the odd field and a second time just before displaying the even field. This requirement implies that the internal decoding operation is performed at a higher rhythm (34 MHz instead of 16 MHz for an MPEG decoding operation of the conventional type), and that the stream of input signals is preserved for a longer period (a supplementary picture period) in the input memory 110. This storage requirement corresponds to 40 ms×16 Mbits/second, i.e. 600 kbits. The economy of space in the memory, which would be approximately 4 Mbits in that, according to the invention, storage of the information components of type B is avoided, is thus actually corrected for a value which is slightly lower, i.e. of the order of 3.2 Mbits, but remains interesting.

In a variant of this method, it may be envisaged to include the conversion of the format of macroblocks into the video display format in the decoding step itself so as to maintain the memory bandwidth within practical limits. Such an internal conversion only requires 92 kbits in this case (corresponding to eight field lines for the luminance and eight picture lines for the chrominance).

In another embodiment the method of decoding-on-the-fly according to the invention may be carried out in the following manner. The step of decoding the coded video signals is subdivided into two decoding sub-steps:

(a) the first sub-step allows do of the definition signals associated with the macroblocks (always of the type B) at the nominal frequency (the picture frequency) and for each of these macroblocks;

(b) the second sub-step is provided for decoding the useful signals, without buffer storage, at the display frequency (the field frequency) and for each of these macroblocks.

The definition signals decoded during the first decoding sub-step are temporarily stored in an external memory region referred to as auxiliary memory throughout the following description. The second sub-step is a sub-step of decoding-on-the-fly, at the display rate, of the useful signals of the type B macroblocks (actually, all the essential parameters for defining these macroblocks will be stored in the auxiliary memory during the first step, and thus only the signals obtained from the transform of the spatial domain into the frequency domain (here the coefficients other than the DC coefficient obtained by discrete cosine transform) remain to be decoded by means of variable-length decoding.

It should be noted that, since the lengths of each block are known, these variable-length decoding operations may be perfectly performed in parallel, for example by a parallel arrangement of two variable-length decoding circuits, one circuit acting on the start of a line of macroblocks and the other acting on the middle of this line. In all cases, the motion compensation is effected during this second step on the basis of motion vectors which, forming part of the definition signals, have been stored in the auxiliary memory during the first step.

Figure 11:
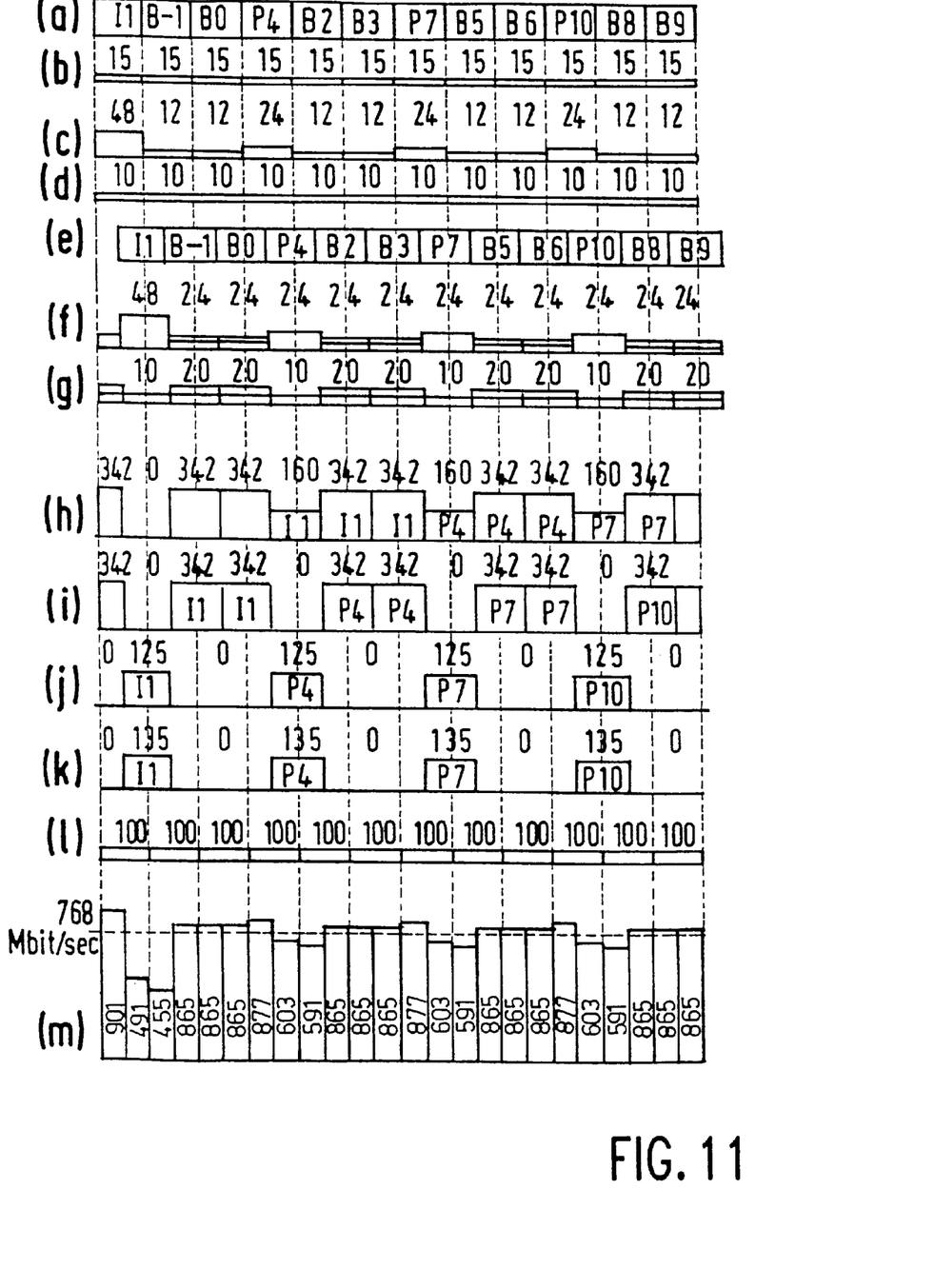
FIGS. 11 and 12 indicate, in two distinct examples of the coding method according to the invention (but always in the situation which would be the most unfavourable) the new limitations of the Bandwidth which are more favourable than in the case of the known decoder.

In this embodiment of the decoding method according to the invention (decoding in two successive sub-steps at the nominal rate and at the display rate, respectively), FIG. 11 shows the restrictions of the bandwidth in the course of the decoding process, here again in the most unfavourable situation. This most unfavourable situation corresponds to the case where all the macroblocks of a picture B must be interpolated by means of bidirectional prediction and with a definition of the motion vector to half a pixel (which implies reading 9×9 pixels for a block of 8×8 pixels). As in FIG. 10, the indications on each line correspond either to a sequence of pictures (lines a, e, h, i, j, k) or to references of the memory bandwidth (b to d, and f to m) and are, line by line, as follows:

(a) position of the pictures the decoded;

(b) rate of access to the input memory 110;

(c) rate of information between this memory 110 and the decoding circuit 120 for performing the first decoding sub-step;

(d) rate of access of the signals defining the macroblock to the auxiliary memory;

(e) position of the pictures during the second decoding sub-step;

(f) rate of information between the memory 110 and the decoding circuit 120 for performing the second decoding sub-step;

(g) rate of information during reading of the contents of the auxiliary memory at the instant of the second decoding sub-step and immediate display of the data thus decoded on the fly;

(h) and (i) motion compensation beforehand and afterwards for the luminance and chrominance information components the numbers of 160 Mbits/sec and 342 Mbits/sec are obtained as follows: 160=18×18×20×12×25; 342=18×18× 1620×12×50×625/576);

(j) storage of the luminance and chrominance information components obtained during the first decoding sub-step (125 M bits/sec=16×16×1620×12×25);

(k) reading these luminance and chrominance information components with a view to their display;

(l) transfer of information such as headers, etc. (as for the line m in FIG. 10);

(m) memory bandwidth roughly necessary for each picture, taking the various previous operations into account, with an vindication of the average of these values for a group of pictures.

Figure 12:
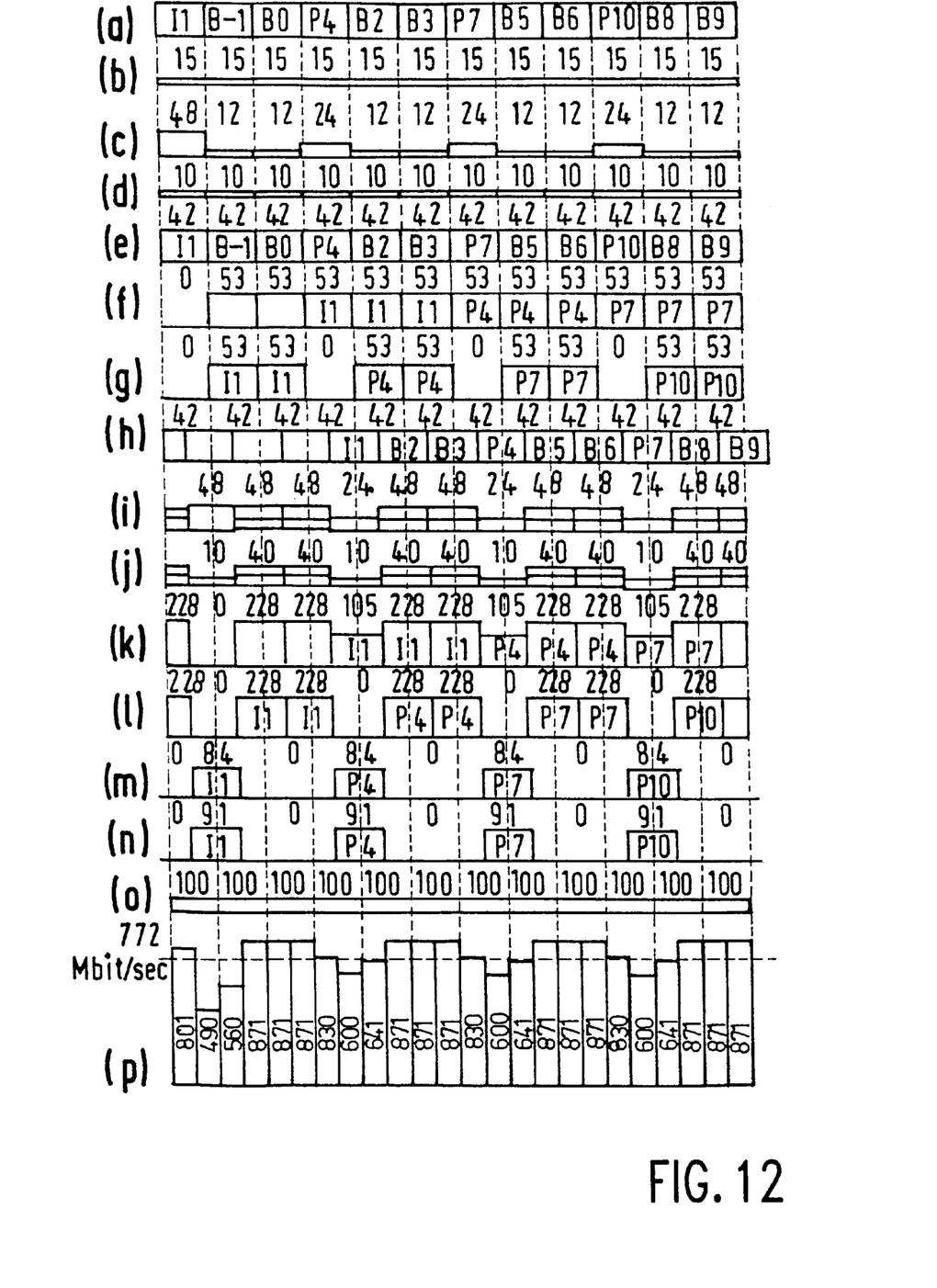

An alternative to the method described hereinbefore is to decode on the fly for the luminance signals only. The chrominance signals will then be treated in the conventional manner. In this third embodiment of the method according to the invention, the economy of the memory bandwidth is less than in the previous embodiment, of the order of 1.2 Mbits as compared with 2.8 Mbits hereinbefore, but remains advantageous. FIG. 12 shows the new restrictions of the bandwidth in this case, with indications on each line always corresponding either to a sequence of pictures (lines a, e, f, g, j, k, l, m) or to references of the memory bandwidth (lines b to p):

(a) pictures to be decoded;

(b) rate of access to the input memory 110;

(c) rate of information between this memory 110 and the decoding circuit 120 for performing the first decoding sub-step;

(d) rate of access of the signal defining the macroblock to the auxiliary memory;

(e) conventional decoding of the chrominance information components during the first decoding sub-step;

(f) and (g) motion compensation beforehand and afterwards, respectively, for the chrominance information components (53 Mbits/sec=9×9×2×1620×25×8);

(h) display of the chrominance information components (42 Mbits/sec=8×8×2×1620×25×8);

(i) rate of information between the memory 110 and the decoding circuit 120 for performing the second decoding sub-step;

(j) rate of information during reading of the contents of the auxiliary memory at the instant of the second decoding sub-step and immediate display of the data thus decoded on the fly;

(k) and (l) motion compensation beforehand and afterwards, respectively, for the luminance information components (105 Mbits/sec=18×18×1620×8×25; 228 Mbits/sec=18×18×1620×8×50×625/576);

(m) storage of the luminance information components obtained during the first decoding sub-step (84 Mbits/sec= 16×6×1620×8×25);

(n) reading these luminance information components with a view to their display (91 Mbits/sec=16×16×1620×8×25× 625/576);

(o) transfer of information such as headers, etc. (similarly as for the line m of FIG. 10 or the line 1 of FIG. 11);

(p) memory bandwidth roughly necessary for each picture, taking the various previous operations into account, with an indication of the average of these values for a group of pictures.

Figure 13:
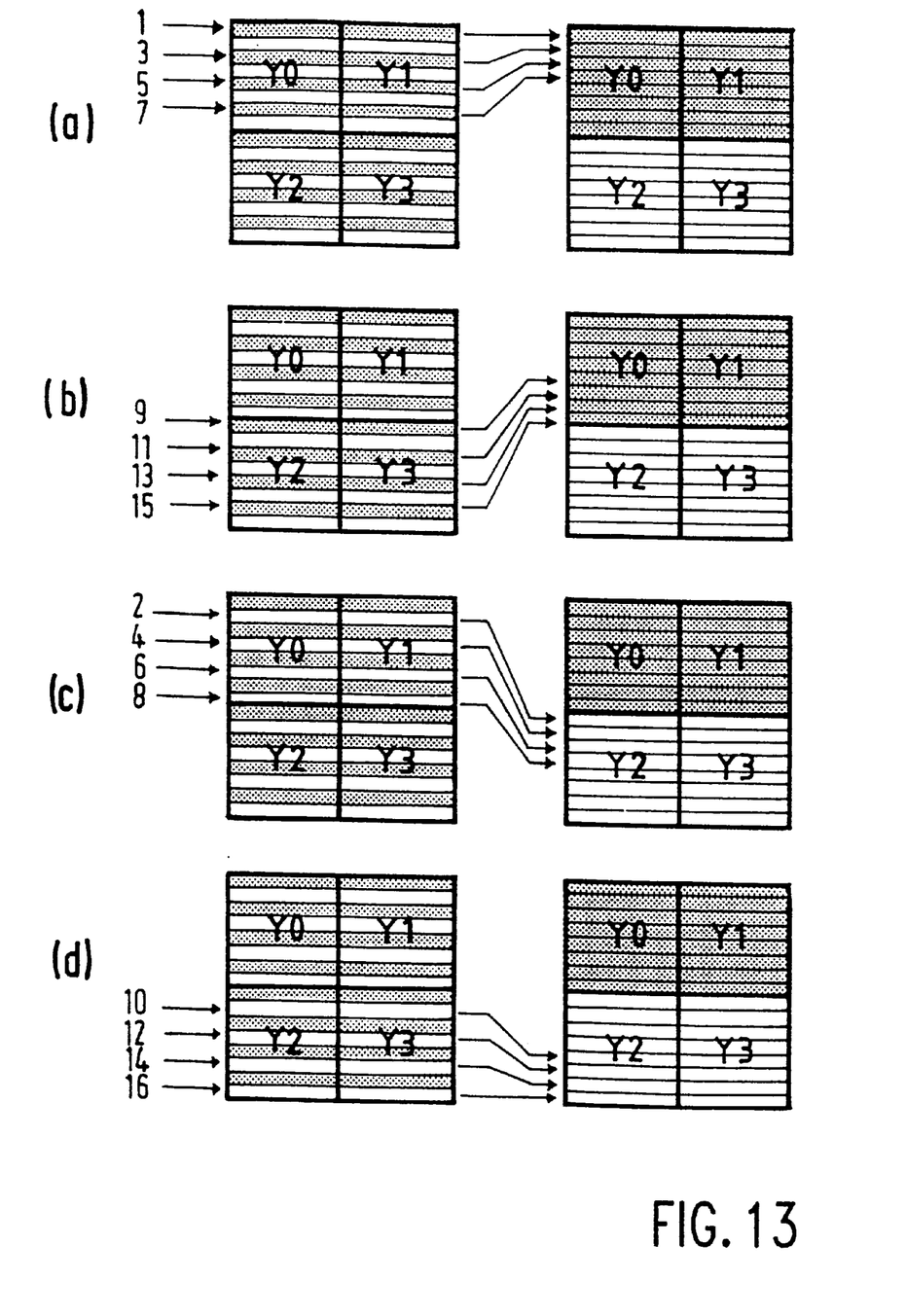
FIG. 13 shows the structure of the lines of four luminance blocks of a macroblock and illustrates the principle of the format conversion which is necessary before displaying the decoded signals.

The invention is not limited to the embodiments described and illustrated hereinbefore, but other variants based on these embodiments may be proposed. Particularly in the latter embodiment it is alternatively to perform the operation of converting the macroblock format into the video display format in the internal memory of the decoding circuit instead of in the external memory. Again in space in the internal memory may also be obtained in the following case. It is known that operations of transforming the signals to be decoded from the spatial domain to the frequency domain and subsequently of quantization are performed before the variable-length decoding operation. The coefficients thus obtained as substitutes for signals before transform are regrouped into blocks in the macroblocks. FIG. 13 shows the four luminance blocks of a macroblock and illustrates the principle of format conversion required before display. The internal memory space for this conversion may be divided by two if said clocks are not decoded in accordance with the order of transmission, but differently, in the order of lines to be displayed per field. Dependent on whether the field to be decoded is the odd field or the even field, and dependent on the type of coding (field or frame coding) of the macroblock and of the lines to be displayed (the four upper lines or the four lower lines), only the two upper blocks (0 and 1 in FIG. 13) or only the two lower blocks (2 and 3 in FIG. 13) are preserved, while the DC coefficient and the length of each block are in any case available in the auxiliary memory.

Figure 14:
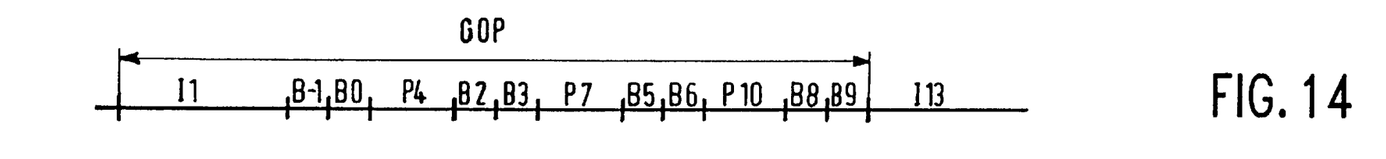
FIGS. 14 to 21 show, with respect to FIGS. 3 to 9, new diagrams corresponding to one of the implementations of the method according to the invention.
Figure 15:
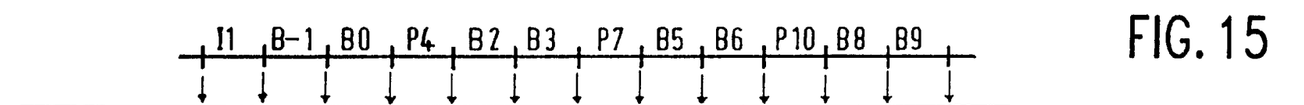
Figure 16:
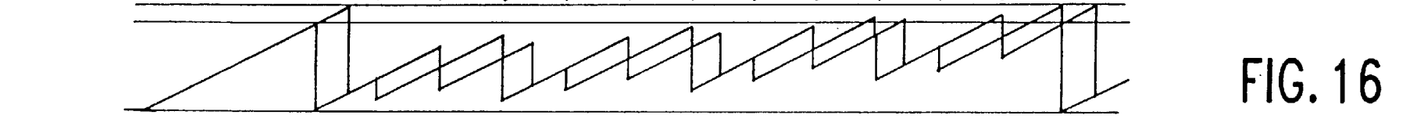
Figure 17:
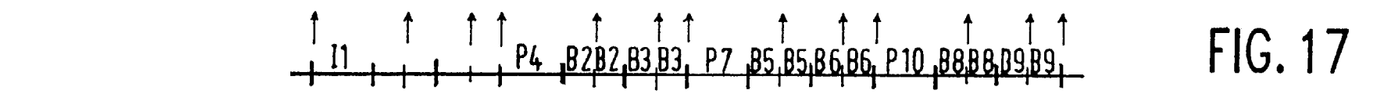
Figure 18:
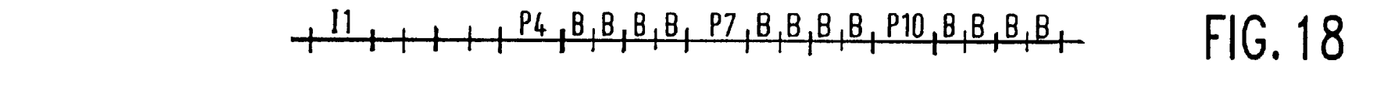
Figure 19:
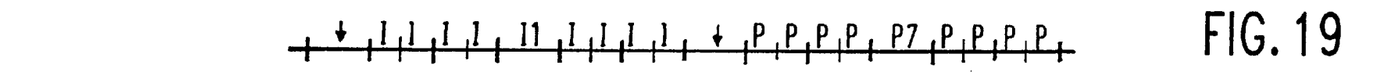
Figure 20:
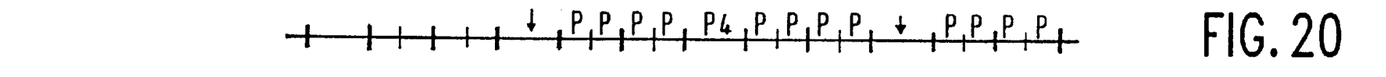
Figure 21:
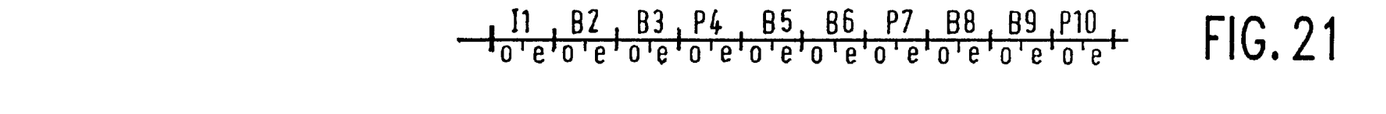

Another variant is to generalize the decoding method into two sub-steps according to the invention to the pictures I and P. As has been seen, the decoding on the fly of the macroblocks of type B allows reduction of the memory bandwidth and thus a free memory capacity for supplementary operations. By applying this decoding principle also to the macroblocks of the pictures I and P, the presence of high peaks occurring in the processing operation and in the values of the memory bandwidth is avoided. It is sufficient to perform this operation at the nominal rate this time, because the information components of the type I and P are not required to be used immediately for motion compensation and/or display. In the variant thus proposed, the operation is modified with respect to that described with reference to FIGS. 3 to 9, and FIGS. 14 to 21 show the new corresponding diagrams as follows:

FIG. 14, which is identical to FIG. 3, shows the stream of input data per picture;

FIG. 15 illustrates the realisation of the first decoding sub-step applied to each picture I, P, B in this case;

FIG. 16 shows, picture by picture, the process of storage in the FIFO memory and shows, in comparison with FIG. 4, the lengthening of each storage period due to the supplementary delay of storage of the decoded definition signals of each macroblock in the auxiliary memory;

FIG. 17 illustrates the realisation of the second decoding sub-step;

FIGS. 18 to 20 show the contents of the auxiliary memory (definition signals associated with each macroblock) and of the two reference memories;

FIG. 21 represents the sequence of restored and displayed pictures in their natural order corresponding to the order they had in the original sequence before coding.

It should be noted that the invention not only relates to the method described hereinbefore in its various embodiments, but also to any system for carrying out this method. In this respect it is to be noted that a preferred embodiment of such a device comprises a microprocessor with connections for performing the method described hereinbefore in one of the proposed variants under the control of a set of appropriate instructions. To this end, the system according to the invention for decoding coded video signals which result from series coding macro blocks of pictures consisting of two interlaced fields, each macroblock comprising luminance blocks and chrominance blocks, and have been transmitted and/or stored in the form of digital signals which regroup the signals defining parameters of each macroblock and the useful signals associated with each pixel of each macroblock and correspond to sequential pictures of type I, P or B, respectively, dependent on whether said pictures are code without reference to another picture of the sequence or are composed of macroblocks, the majority of which is predicted by means of unidirectional motion compensation based on an I or P picture, or of macroblocks, the majority of which is interpolated by means of bidirectional motion compensation based on I and/or P previous and subsequent picture, comprises, as mentioned hereinbefore, a decoding sub-assembly 10 connected to a sub-assembly 20 for storing the signals thus decoded via a bus 30. According to the invention, the sub-assembly 10 consisting of a decoding device 11 and a device 12 for displaying the decode signals at the field frequency comprises means for controlling the decoding and display operations, by which means these two operations can be subdivided into two decoding sub-steps an two display sub-steps, one for each field. Each of the sub-steps for decoding a field is then performed just before the corresponding sub-step for displaying the same field, by which any storage of decoded information is avoided. This subdivision and this decoding-on-the-fly only relates to luminance signals, or also to chrominance signals and in the preferred embodiment these embodiments are only used for the macroblocks of type B. However, it is possible to use the same process for macroblocks of type-I pictures and/or for macroblocks of type-P pictures.

It is also possible to provide other embodiments for the means for controlling the display and decoding opera s, with which means, for example, the single operation of decoding can be divided into two decoding sub-steps, the first sub-step only ensuring only the decoding of definition signals of the macroblocks at the nominal frequency (the frame frequency) and the second sub-step only relating to decoding the useful signals of these macroblocks, this time at the display frequency (the field frequency). This second solution has the advantage that decoding can be performed more rapidly. For decoding useful signals of each line of macroblocks, it is possible to provide two decoding circuits instead of one, each operating in parallel for decoding half the line of macroblocks (one circuit decoding from the start of this line and the other decoding from the middle).

As has been apparent from the description of the method according to the invention, the operation of converting the format of the macroblocks into the display format may not be performed in the external memory in the sub-assembly 20 but within the decoding sub-assembly at the end of the decoding operation. In this case the memory space restrictions may be reduced if, as has also ben apparent hereinbefore, the blocks of a macroblock are not decoded in the order of transmission, but differently (either the blocks 0 1, or the blocks 2 and 3) in accordance with that of the fields in the course of the decoding process.

The method and system according to the invention thus provide an economy of memory space and memory bandwidth. If the definition signals of the macroblocks represent 256 bits per macroblock, with 1620 macroblocks per picture, it is thus necessary in the embodiments described hereinbefore to provide the external memory for the region referred to as auxiliary memory with a memory space of 256×1620= 414 kbits which may be adjusted to 400 kbits because in reality not all macroblocks are coded. The global restrictions of the memory are thus as follows:

input buffer memory: 3.1 Mbits;

the two reference memories: 5 Mbits each;

display memory: 1.6 Mbit (if the method according to the invention only concerns the luminance component) or 0 the method concerns the luminance and chrominance components);

auxiliary memory: approximately 0.4 Mbit;

which leads to a global occupation of 13.5 or 15.1 Mbits dependent on whether the chrominance is included in the processing operation according to the invention. For an external memory size of $2^{24}$=16.8 Mbits, the space now left free in the memory thanks to implementation of the method according to the invention is thus approximately 1.7 Mbit if the invention relates to the luminance component only and 3.3 Mbits if the invention also relates to the chrominance component. This result applies to the systems processing 625 lines/50 Hz picture sequences. In the case of 525 lines/60 Hz systems, the reference memories do not occupy more than 4.2 Mbits instead of 5, which now increases the above-mentioned values to 3.3 Mbits and 4.9 Mbits, respectively. It will be noted that the number of 3.1 Mbits for the input buffer memory capacity corresponds to the most unfavourable situation and that in practice this value will be a bit lower, which extends the free space in the memory in this case as well.

Finally it should also be noted that the invention relates to any video reception equipment comprising a decoding system particularly adapted to process MPEG coded video signals or implementing a decoding method in which the decoding and display steps or sub-steps, as described above, are provided for processing MPEG coded video signals.

I claim:

1. A method of decoding coded video data comprised of series-coded macroblocks of pictures consisting of two interlaced fields, each macroblock being comprised of luminance blocks and chrominance blocks, the coded video data including a first type of data which defines parameters of each macroblock and a second type of data which constitutes actual pixel values, and the pictures including type I (intraframe-coded), P (unidirectionally predictive-coded), and B (bi-directionally predictive-coded) pictures, wherein coded video data is decoded to produce decoded video data and the decoded video data is displayed at a field frequency, wherein, with respect to coded video data relating to the luminance of each macroblock associated with type B pictures each having first and second fields, the method comprises, in series, the steps of:

decoding the coded video data for the first field to produce decoded video data for the first field;

displaying the first field in response to the decoded video data for the first field;

decoding the coded video data for the second field to produce decoded video data for the second field; and,     displaying the second field in response to the decoded video data for the second field; and,     wherein the macroblock associated with type B pictures are decoded and displayed without requiring any buffer storage of the decoded video data relating to the luminance of the macroblock associated with type B pictures.

2. A method of decoding coded video data comprised of series-coded macroblocks of pictures consisting of two interlaced fields, each macroblock being comprised of luminance blocks and chrominance blocks, the coded video data including a first type of data which defines parameters of each macroblock and a second type of data which constitutes actual pixel values, and the pictures including type I (intraframe-coded), P (unidirectionally predictive-coded), and B (bi-directionally predictive-coded) pictures, wherein coded video data is decoded to produce decoded video data and the decoded video data is displayed at a field frequency, wherein, with respect to coded video data relating to the luminance of each macroblock associated with type B pictures each having first and second fields, the method comprises, in series, the steps of:

decoding, at a frame rate, the first type of data associated with the macroblock associated with the type B pictures;

decoding, at a field rate, the second type of data defining the type B pictures;

displaying the type B pictures in response to the first and second decoding steps; and,     wherein the macroblock set associated with type B pictures are decoded and displayed without requiring any buffer storage of the coded video data relating to the luminance of the macroblock associated with type B pictures.

3. The method as set forth in claim 1, wherein the second decoding sub-step is subdivided into two parallel operations of variable-length decoding each macroblock line to ensure parallel decoding of one-half of each macroblock line.

4. A system for decoding coded video data comprised of series-coded macroblocks of pictures consisting of two interlaced fields, each macroblock being comprised of luminance blocks and chrominance blocks, the coded video data including a first type of data which defines parameters of each macroblock and a second type of data which constitutes actual pixel values, and the pictures including type I (intraframe-coded), P (unidirectionally predictive-coded), and B (bi-directionally predictive-coded) pictures, the system comprising:

a decoding section which decodes the coded video data to produce decoded video data;

a display section which decodes the decoded video data at a field frequency;

a control section for causing the decoding section and display section to serially perform the following operations, with respect to type B pictures each having first and second fields:

decode the coded video data for the first field to produce decoded video data for the first field;

display the first field in response to the decoded video data for the first field;

decode the coded video data for the second field to produce decoded video data for the second field; and,         display the second field in response to the decoded video data for the second field; and,     wherein the macroblocks associated with type B pictures are decoded and displayed without requiring any buffer storage of the decoded video data relating to the luminance of the macroblocks associated with type B pictures.

5. A system for decoding coded video data comprised of series-coded macroblocks of pictures consisting of two interlaced fields, each macroblock being comprised of luminance blocks and chrominance blocks, the coded video data including a first type of data which defines parameters of each macroblock and a second type of data which constitutes actual pixel values, and the pictures including type I (intraframe-coded), P (unidirectionally predictive-coded), and B (bi-directionally predictive-coded) pictures, the system comprising:

a decoding section which decodes the coded video data to produce decoded video data;

a display section which displays the decoded video data at a field frequency;

a control section for causing the decoding and display sections to serially perform the following operations, with respect to coded video data relating to the luminance of each macroblock associated with type B pictures each having first and second fields:

decode, at a frame rate, the first type of data associated with the macroblocks associated with type B pictures;

decode, at a field rate, the second type of data defining the type B pictures;

display the type B pictures; and,     wherein the macroblocks associated with type B pictures are decoded and displayed without requiring any buffer storage of the coded video data relating to the luminance of the macroblocks associated with type B pictures.

\* \* \* \* \*